(12) United States Patent
Kobashi

(10) Patent No.: US 8,830,492 B2
(45) Date of Patent: Sep. 9, 2014

(54) DATA PROCESSING APPARATUS FOR SENDING A SINGLE JOB BASED ON COMMON DOCUMENT INFORMATION

(75) Inventor: Kazufumi Kobashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 864 days.

(21) Appl. No.: 12/831,071

(22) Filed: Jul. 6, 2010

(65) Prior Publication Data

US 2011/0007352 A1    Jan. 13, 2011

(30) Foreign Application Priority Data

Jul. 10, 2009  (JP) ................................. 2009-164139

(51) Int. Cl.
   *G06F 3/12*   (2006.01)

(52) U.S. Cl.
   USPC ....... 358/1.13; 358/1.15; 358/1.18; 358/1.12; 715/230; 715/231; 715/255

(58) Field of Classification Search
   CPC ... G06F 3/1208; G06F 3/1285; G06F 12/231; G06F 3/1242; G06F 3/1262; H04N 1/00196
   USPC ............. 358/403, 1.2, 1.12, 1.13, 1.14, 1.15; 715/208, 230, 231, 255
   See application file for complete search history.

(56) References Cited

U.S. PATENT DOCUMENTS

| | | | | |
|---|---|---|---|---|
| 5,193,110 A | * | 3/1993 | Jones et al. | 379/93.14 |
| 5,861,958 A | * | 1/1999 | Jamrog | 358/403 |
| 6,026,416 A | * | 2/2000 | Kanerva et al. | 715/208 |
| 7,245,392 B2 | * | 7/2007 | Quach | 358/1.15 |
| 7,694,218 B2 | * | 4/2010 | Masuda et al. | 715/230 |
| 7,715,032 B2 | * | 5/2010 | Bird et al. | 358/1.15 |
| 8,531,708 B2 | * | 9/2013 | Saito | 358/1.15 |
| 8,693,011 B2 | * | 4/2014 | Mori | 358/1.12 |
| 2002/0087602 A1 | * | 7/2002 | Masuda et al. | 707/515 |
| 2003/0169458 A1 | * | 9/2003 | Quach | 358/400 |
| 2005/0066274 A1 | * | 3/2005 | Fujishige et al. | 715/517 |
| 2005/0162667 A1 | * | 7/2005 | Felix et al. | 358/1.1 |
| 2007/0002392 A1 | * | 1/2007 | Ogura | 358/448 |
| 2007/0079227 A1 | * | 4/2007 | Singh et al. | 715/500 |
| 2007/0139704 A1 | * | 6/2007 | Ogura | 358/1.15 |
| 2008/0086542 A1 | * | 4/2008 | Mukherjee et al. | 709/219 |
| 2008/0144066 A1 | * | 6/2008 | Ferlitsch | 358/1.13 |
| 2009/0122336 A1 | * | 5/2009 | Honma | 358/1.15 |
| 2010/0250340 A1 | * | 9/2010 | Lee et al. | 705/10 |

FOREIGN PATENT DOCUMENTS

| | | |
|---|---|---|
| JP | 07-221896 A | 8/1995 |
| JP | 2001-154932 A | 6/2001 |
| JP | 2004-072166 A | 3/2004 |
| JP | 2005-333447 A | 12/2005 |
| JP | 2006-203478 A | 8/2006 |
| JP | 2006-350634 A | 12/2006 |
| JP | 2008-085401 A | 4/2008 |
| JP | 2009-124316 A | 6/2009 |

* cited by examiner

*Primary Examiner* — Dennis Dicker
(74) *Attorney, Agent, or Firm* — Canon U.S.A., Inc. IP Division

(57) ABSTRACT

Document information that a user wishes to send by FAX is selected from a list of registered document information. If it is determined that a pre-set sending method flag for the selected document information is set to bundled transmission, drawing information generated by each application is converted into common document information. Further, after the converted common document information is merged into a single piece of information, drawing information to be converted via a FAX driver of the document information that the user wishes to send is sent to an image processing apparatus as a single job.

15 Claims, 13 Drawing Sheets

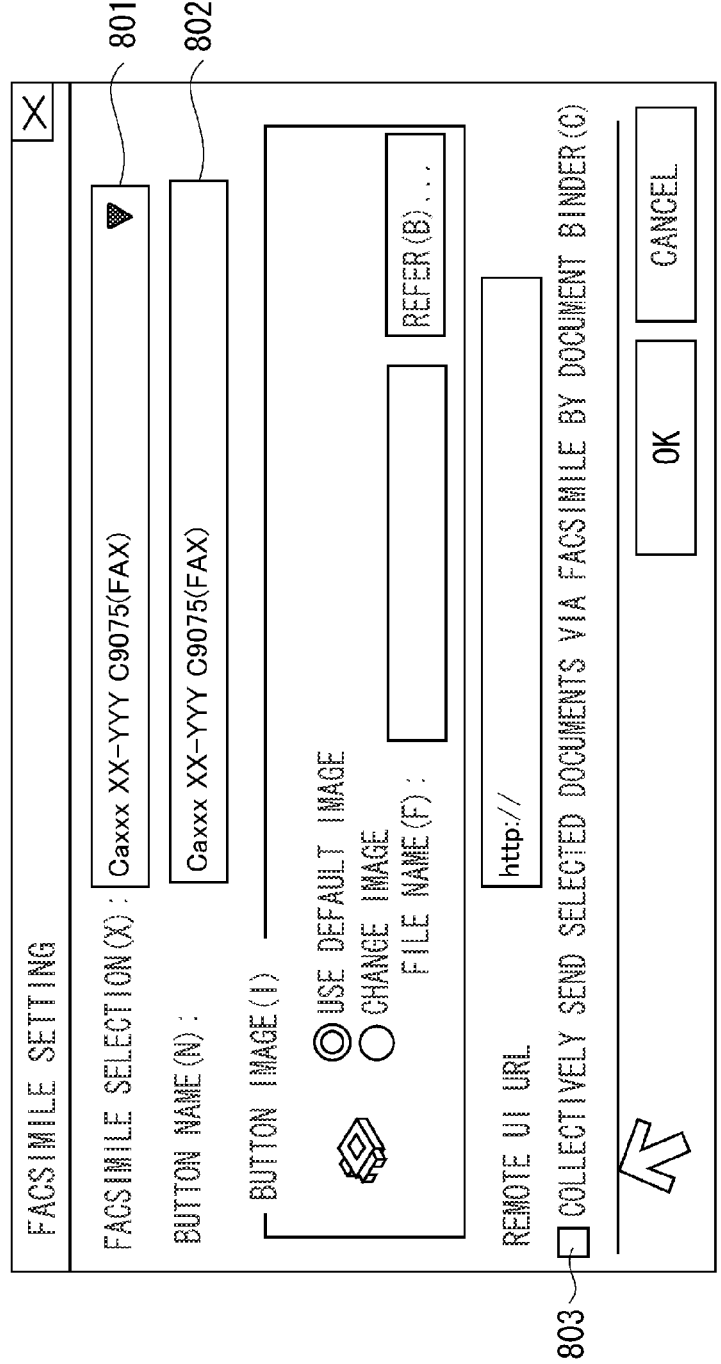

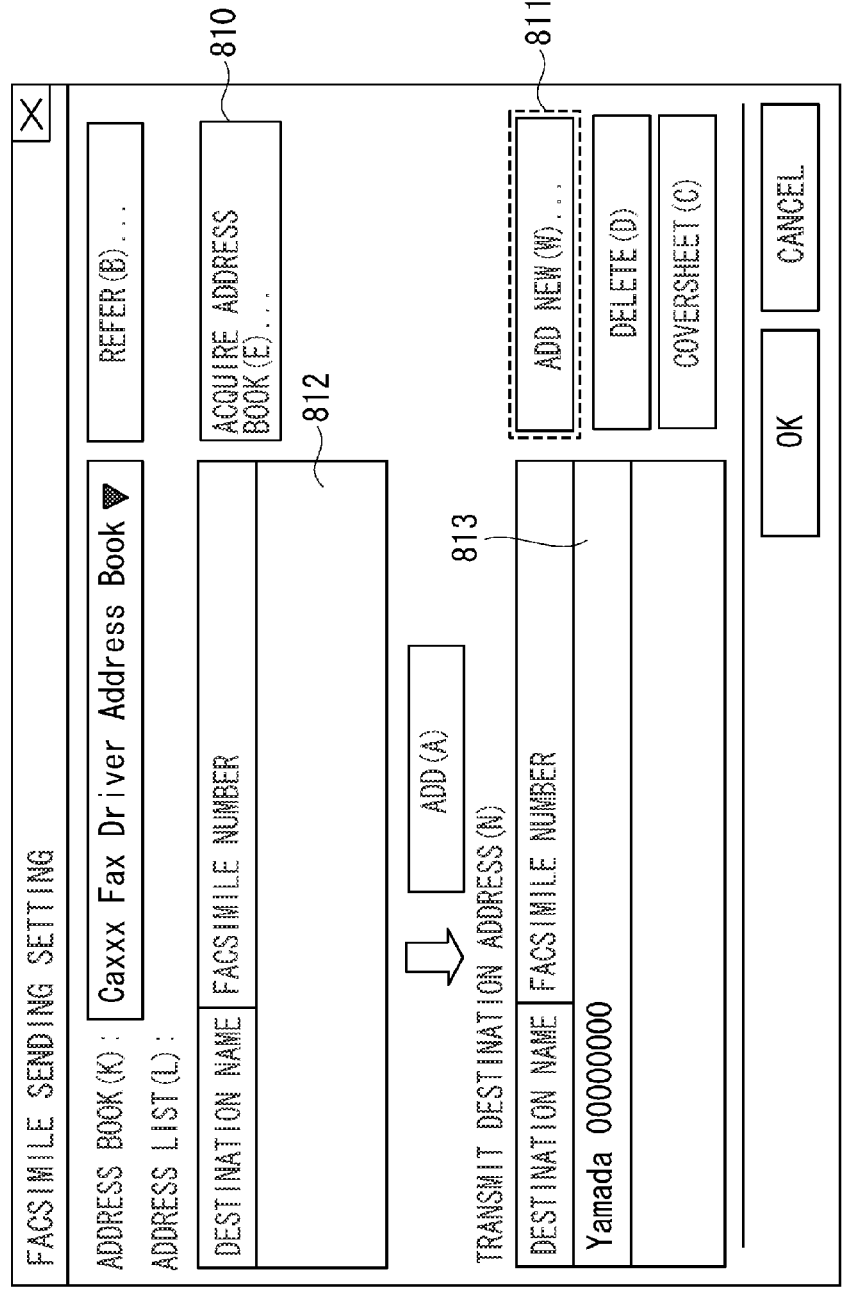

DATA PROCESSING APPARATUS FOR SENDING A SINGLE JOB BASED ON COMMON DOCUMENT INFORMATION

BACKGROUND OF THE INVENTION

1. Field of the Invention

The present invention relates to a data processing apparatus for sending data to an image processing apparatus, and a data processing method and program thereof.

2. Description of the Related Art

Conventionally, there have been systems for sending a facsimile (FAX) that transfer a FAX job created using a FAX driver of a data processing apparatus to the multifunction peripheral device using a FAX function of a multifunction peripheral device.

Further, document information having different file formats generated by applications installed in the data processing apparatus can be sent via FAX by converting such document information into a common file format. For example, portable document format (PDF) is sometimes used as "common file format".

In such a system, for a user to send via FAX the document information having different file formats, the FAX transmission has to be performed by individually designating each of the files. More specifically, the user has to repeat a troublesome file selection instruction and FAX sending instruction, which is very inconvenient. Consequently, if the number of applications handled by the data processing apparatus increases, this trouble increases even further.

SUMMARY OF THE INVENTION

The present invention is directed to improving the operability of applications when sending data to an image processing apparatus.

Further, the present invention is directed to providing a technique enabling the bundling of document information having different data structures generated by various applications and sending the document information as a single job to an image processing apparatus.

According to an aspect of the present invention, the data processing apparatus which can send a job to an image processing apparatus includes a storage unit configured to store document information generated by a plurality of applications, a selection unit configured to select from the document information stored in the storage unit a plurality of document information to be sent by FAX, and a sending unit configured to send drawing information obtained from the plurality of document information selected by the selection unit as a single job for FAX transmission by the image processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 8A, 8B, and 8C illustrate examples of a UI which can be displayed by a data processing apparatus.

DESCRIPTION OF THE EMBODIMENTS

Various exemplary embodiments, features, and aspects of the invention will be described in detail below with reference to the drawings.

Figure 1:
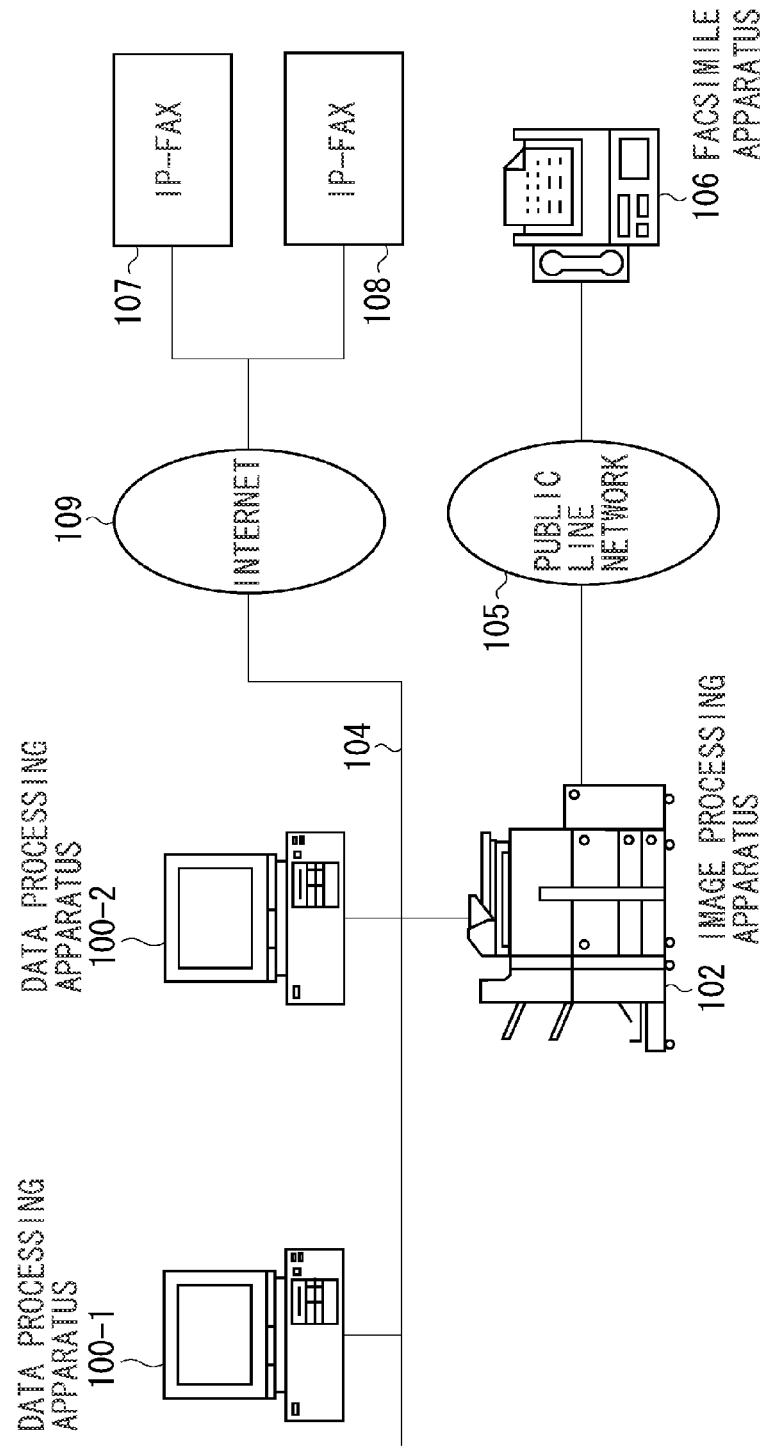
FIG. 1 illustrates a configuration of a data processing system.

FIG. 1 illustrates a configuration of a data processing system according to a first exemplary embodiment of the present invention. In a system according to this exemplary embodiment, a data processing apparatus and an image processing apparatus capable of sending FAX and receiving function processing can communicate via a network. Further, in this example, the image processing apparatus can communicate with another FAX apparatus via a public line.

In FIG. 1, data processing apparatuses 100-1 and 100-2 are computers which a user uses to instruct an image processing apparatus 102 to send FAX. The image processing apparatus 102 is a multifunction peripheral (hereinafter, simply referred to as "MFP"), which in addition to a FAX function, also includes functions such as a copier function, a scanner function, a printer function, and a file sending function.

A predetermined operating system (OS) and various applications for executing specific function processing are installed in the data processing apparatuses 100-1 and 100-2.

Examples of such specific function processing include document processing, spreadsheet processing, presentation processing, image processing, and graphics processing. Each application has its own data structure (file structure). Further, the OS is configured so that it can reference the extension of each file, and issue a printing instruction to the corresponding application.

An integration application for integrating and managing the various functions on the desk top is also installed in the data processing apparatuses 100-1 and 100-2 according to the present exemplary embodiment.

This integration application includes a function for improving FAX operations, a function for managing information, a function for reducing printing costs, a function for improving computerized operations of paper, a function for performing approval operations by an electronic document, and a function for sharing information within a company.

The function for improving FAX operations includes processing which functions to instruct an image processing apparatus to send a FAX by bundling application data having different formats.

In the present exemplary embodiment, the means for realizing FAX transmission by bundling application data having different formats will be described using an example of a document in which the file format (data structure) of the document information to be integrated is portable document format (PDF). However, the present exemplary embodiment is not limited to a PDF document, as long as the document can be integrated and managed.

Further, the each application described herein is also not limited to a specific application.

The data processing apparatuses 100-1 and 100-2 exchange information with each other via a local area network (LAN) 104 which connects the apparatuses. The image processing apparatus 102 and a FAX apparatus 106 send and receive FAX information via a public line 105. The FAX apparatus 106 is externally provided to receive FAX data sent from the image processing apparatus 102.

Further, the image processing apparatus 102 illustrated in the present exemplary embodiment is configured so that it can transfer similarly Internet FAX data received via the LAN 104 to IP-FAXs 107 and 108. This "Internet FAX" (iFAX) is a device (T.37/T.38 protocol) which sends and receives image data in FAX format attached to electronic mail based on an electronic mail protocol. Examples of electronic mail protocols which may be used include, as a sending protocol, simple mail transfer protocol (SMTP), and as a receiving protocol, SMTP and post office protocol 3 (POP3).

The T.38 protocol provides a function for encoding a FAX signal into Internet protocol (IP) FAX packets, and then sending that signal to a receiving side gateway over an IP network. Then, the receiving side gateway decodes the IP FAX packets into the FAX signal, and calls the FAX apparatus on the opposite side by public switched telephone network (PSTN).

Figure 2:
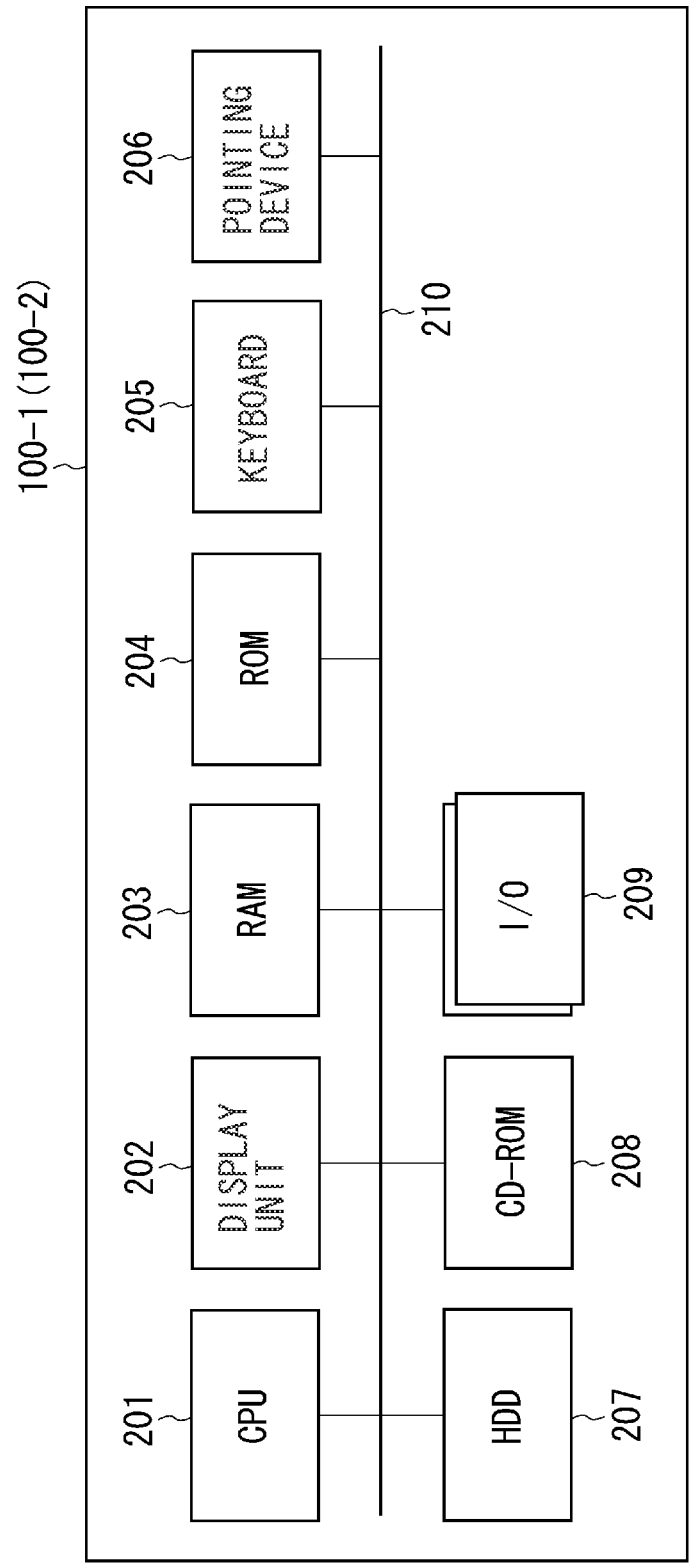
FIG. 2 illustrates a hardware configuration of a data processing apparatus.

FIG. 2 illustrates a hardware configuration of the data processing apparatuses 100-1 and 100-2 illustrated in FIG. 1.

FIG. 2 includes a keyboard 205 and a pointing device 206, which are input devices which receive user operation inputs. Further, a data processing apparatus 200 has a display unit 202 which gives visual output information feedback to the user.

In addition, FIG. 2 includes storage devices such as a random access memory (RAM) 203, a hard disk drive (HDD) 207, a read-only memory (ROM) 204, and a compact disk (CD) ROM 208. These storage devices store various programs and execution information used in the present exemplary embodiment. FIG. 2 also includes an interface device input/output (I/O) 209 for communicating with external devices, and a central processing unit (CPU) 201 for performing program execution.

Figure 3:
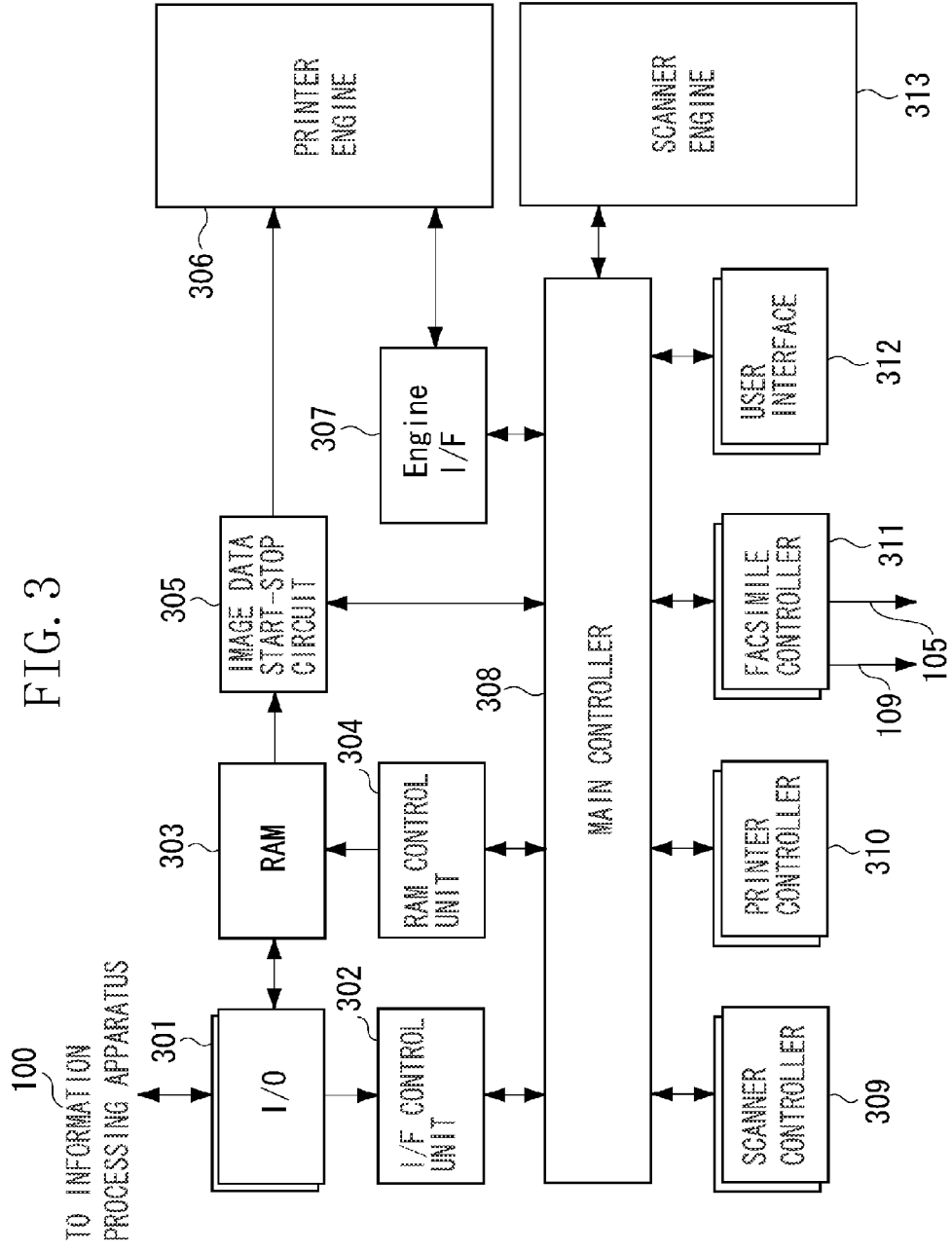
FIG. 3 is a block diagram illustrating a hardware configuration of an image processing apparatus.

The connection mode with a peripheral device may be wired or wireless. The data processing apparatuses 100-1 and 100-2 may also be connected to the image processing apparatus 102 via this external device connection I/F. FIG. 3 is a block diagram illustrating a hardware configuration of the image processing apparatus illustrated in FIG. 1. Further, this example illustrates an example of a MFP having a scanner function, a printer function, and a FAX function.

In FIG. 3, an I/O 301 is connected with the data processing apparatuses 100-1 and 100-2 via a communication intermediary such as the LAN 104. A plurality of I/O(s) 301 may be provided corresponding to a plurality of connection modes.

The image processing apparatus 102 transfers a device ID and a scanned image via the I/O 301 to the data processing apparatuses 100-1 and 100-2. Further, the I/O 301 receives and processes various control commands from the data processing apparatuses 100-1 and 100-2.

An I/F control unit 302 performs a control for issuing a device ID relating to the processing system of the scanner and printer, or the FAX, mounted on the image processing apparatus 102. The RAM 303 is used to store external data such as control commands acquired by the I/O 301 and images read by a scanner engine 313. Further, the RAM 303 is used to store images rasterized by a printer controller 310 prior to transfer of the image to a printer engine 306.

Assignment management in the RAM 303 is performed by a RAM control unit 304. An image data start-stop circuit 305 is a device for outputting rasterized images to the RAM control unit 304 taken in by the printer controller 310 or the scanner engine 313 in accordance with the rotation of the printer engine 306.

The printer engine 306 is a device for developing an image on an output media such a sheet of paper. A main controller 308 performs various controls of the printer engine 306 by an engine I/F 307.

Further, the main controller 308 is the main control module, which performs appropriate sorting of the control languages received by the data processing apparatuses 100-1 and 100-2 via the I/O 301 in a scanner controller 309, the printer controller 310, and a FAX controller 311. In addition, the main controller 308 receives support from the respective controllers and a user interface 312, and controls the printer engine 306 and the scanner engine 313.

By integrating the control interfaces between the main controller 308 and each of the various controllers, an expansion board capable of processing a plurality of control commands can be mounted on a single peripheral device. It is also the role of the main controller 308 to manage the device IDs of currently mounted expansion boards acquired from the respective controllers.

The scanner controller 309 divides the scan control commands received from the data processing apparatuses 100-1 and 100-2 into internal execution commands which can be interpreted by the main controller 308. Further, the scanner controller 309 changes an image read by the scanner engine 313 into a scan control command.

The printer controller 310 divides the page description languages received from the data processing apparatuses 100-1 and 100-2 into internal execution commands including a rasterized image of the page description languages which can be interpreted by the main controller 308. The rasterized image is transported to the printer engine 306, and printed on an output media such as a sheet of paper.

The FAX controller 311 rasterizes a FAX control language received from the data processing apparatuses 100-1 and 100-2 into an image, and transfers the rasterized image to another FAX apparatus 106 or IP-FAXs 107 and 108 via the public line 105 or the Internet 109. The user interface 312 is used as an input/output unit for instructions made by the user when directly executing the various settings of the main controller 308, or executing the scanner function, the printer function, and the FAX function in the image processing apparatus 102.

The scanner engine 313 reads the printed image using an optical device based on an instruction from the main controller 308, then converts the read image into an electric signal, and transfers the converted electric signal to the main controller 308.

Figure 4:
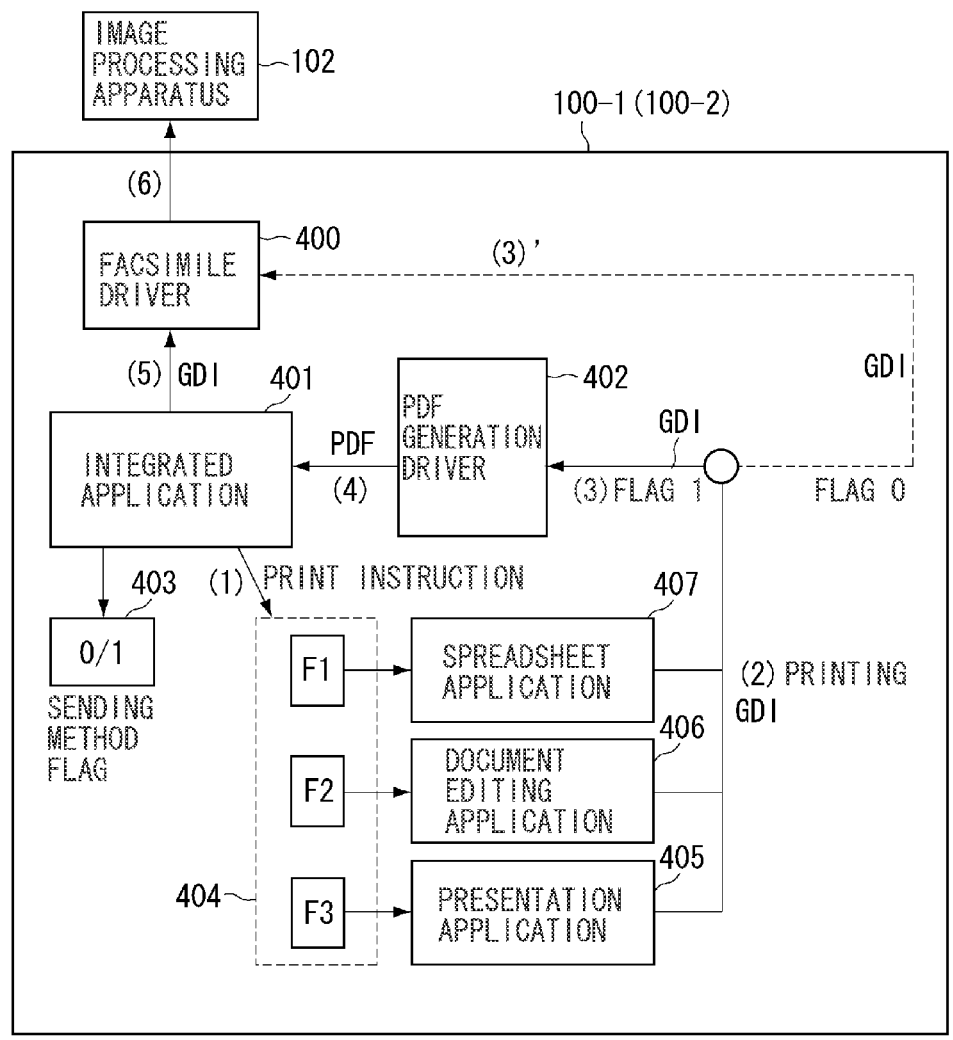
FIG. 4 is a block diagram illustrating a software configuration of a data processing apparatus.

FIG. 4 is a block diagram illustrating a software configuration of the data processing apparatuses 100-1 and 100-2 illustrated in FIG. 1. In this example, a FAX driver 400 identifies bundled transmission by the integration application 401 and individual transmission from the applications 405 to 407. Further, the FAX driver 400 generates a job which requests FAX transmission to be sent to the image processing apparatus 102.

The FAX driver 400 is installed as a system application in the HDD 207. In the HDD 207 are installed a printer driver for sending a print job to the image processing apparatus 102 which can be communicated with, and the FAX driver 400 which sends a bundled transmission job. The integration application 401 includes various user interfaces for executing the various applications described above. The integration application 401 receives the requests made by the user on the desktop of the image processing apparatus 102, and comprehensively manages execution of the processing of the various functions.

A sending method flag 403 is configured so that the user can pre-select bundled (collective) or individual transmission for the FAX sending method on a property screen provided by the integration application 401. If the instruction selected by the user is bundled transmission, the sending method flag 403 stores a "1", while if the instruction selected by the user is individual transmission, the sending method flag 403 stores a "0". Further, the sending method flag 403 is managed by a non-volatile storage device, and is rewritten at any stage based on the sending method selected on the property screen of the FAX driver 400. Moreover, the integration application 401 directly manages the rewriting of the sending method flag 403.

Selected document information 404 is transferred along with the FAX ID to the respective applications 405 to 407 corresponding to the print instructions.

The application 405 is a presentation application which performs data processing by processing various kinds of images, characters, graphics, and outputting the processed data as a still image to a screen or a display apparatus based on an instruction from the user. Further, the application 505 displays a screen as a print result. The application 405 is configured so that it can successively and reversibly update a page based on an instruction from a pointing device or the like, and which can update the displayed page based on a request from an questioner.

The application 406 is a document editing application which can produce document information as a word processor in which an object such as a graphic or an image can be pasted together.

The application 407 executes spreadsheet processing by inputting characters and numerals into a displayed cell. Further, by enabling a created macro, the application 407 causes a program to be executed in a specified sequence, and also displays the result.

A PDF generation driver 402 is a PDF driver for executing conversion processing from drawing information into common document information. When the sending method flag 403 is "1", the PDF generation driver 402 executes processing for converting the drawing information output by the respective applications 405, 406, and 407 into integrated document information in PDF format. When the sending method flag 403 is "0", the PDF generation driver 402 is controlled so as to output the drawing information (e.g., a graphics command interface (GDI) command) output by the respective applications 405, 406, and 407 to the FAX driver 400.

If the sending method flag 403 is "1", the integration application 401 receives the PDF document information generated by the PDF generation driver 402 from the drawing information output by the respective applications 405, 406, and 407. Then, the integration application 401 performs binder conversion processing to bundle the FAX drivers into a single job and convert the bundled job into a binder which can be sent by FAX. In the common document conversion processing performed by the PDF generation driver 402 to convert the drawing information into common document information, as an example, the PDF generation driver 402 executes processing to convert drawing information (GDI) into PDF document information. Then, binder information is formed from the PDF. For example, by pressing the control or shift keys, a plurality of files can be selected while pointing at a file with the mouse.

The processing state of the integration application 401 in the data processing apparatuses 100-1 and 100-2 will now be described using FIG. 4.

Figure 6:
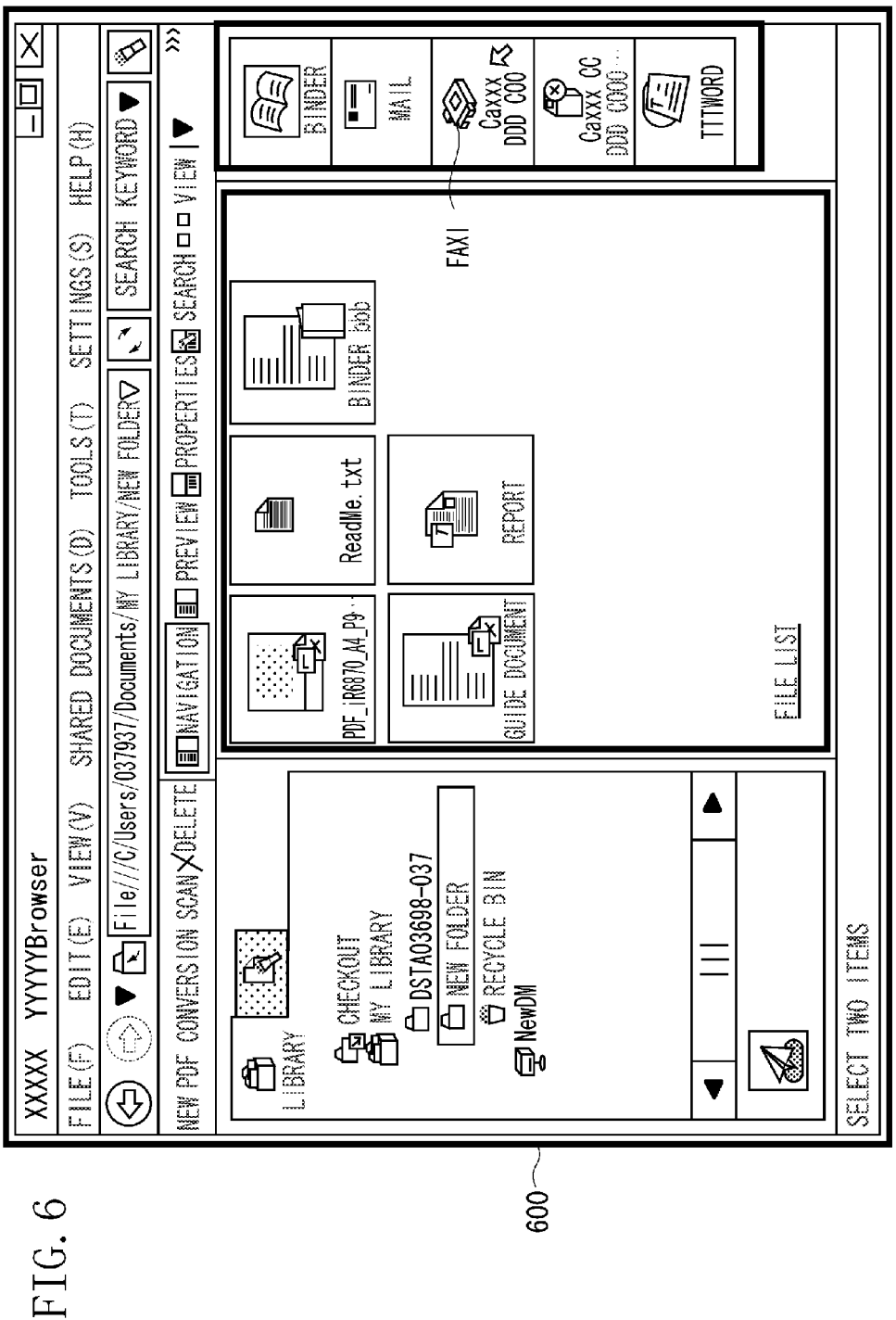
FIG. 6 illustrates an example of a UI which can be displayed by a data processing apparatus.

The user produces a printing instruction (1) by the integration application 401 by selecting a plurality of files on the user interface (UI) illustrated in FIG. 6 with the pointing device 206, and dropping the selected files in the FAX sending icon FAXI. Fax transmission and the printing instruction are completed by selecting a plurality of data in a single drag-and-drop operation.

Next, in response to the printing instruction (1), files having the respective application formats are input by the integration application 401 into the various applications 405 to 407. Then, the respective data is converted (2) into a GDI function (drawing information). The term "file" as used here includes spreadsheet data, word processing document data, and presentation software data.

As long as the value indicating whether the sending method flag 403 is set to bundled FAX transmission or not is a "1", the GDI (drawing information) is input into the PDF generation driver (PDF writer) 402.

Then, the PDF generation driver 402 generates (3) a PDF (common document information) from the plurality of various files (spreadsheet etc.) in response to the GDI function being called.

Figure 5:
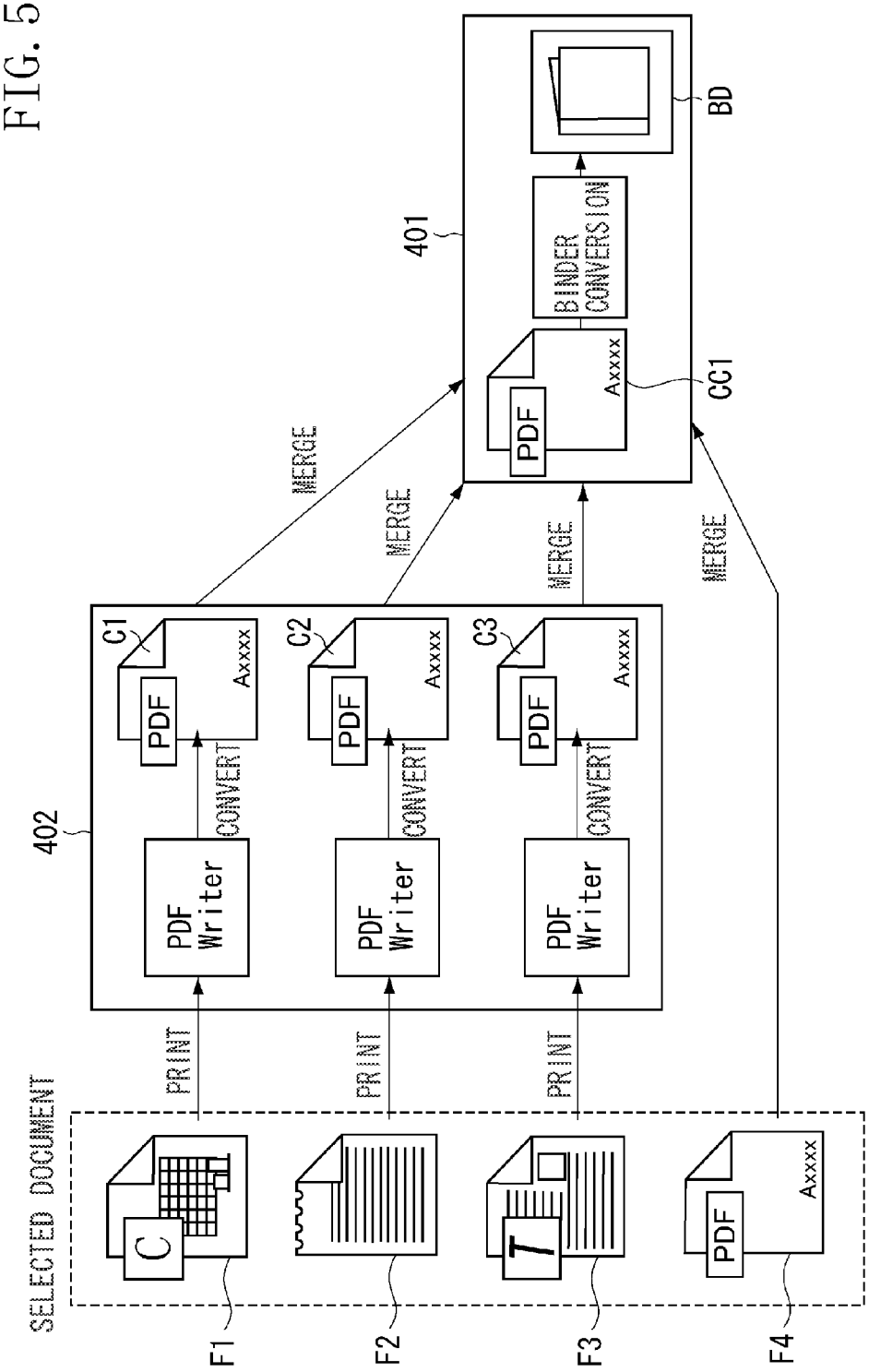
FIG. 5 is a schematic diagram illustrating a document processing example of a data processing apparatus.

The integration application 401 receives common document information (PDF data (4)) in the PDF format from the PDF generation driver 402, and then generates the binder information BD illustrated in FIG. 5. Information for identifying PDF-convertible applications is registered in the PDF generation driver 402. Further, the PDF generation driver 402 includes a function for determining whether the GDI acquired from each application can be converted into a PDF. In addition, the integration application 401 notifies the user about error information received from the PDF generation driver 402 on the UI screen illustrated in FIG. 9.

The integration application 401 stores the PDF data in binder body data in an order specified using the UI screen illustrated in FIG. 8. Further, the integration application 401 stores the application data prior to its input into the PDF generation driver 402, in original document information 703 illustrated in FIG. 7 (this processing may be omitted). The initial order of the documents displayed on the UI screen illustrated in FIG. 8 becomes the list order displayed by the file list of FIG. 6. For example, if the documents are displayed in dictionary order based on their file name, that order is displayed as the file list in FIG. 6.

Figure 9:
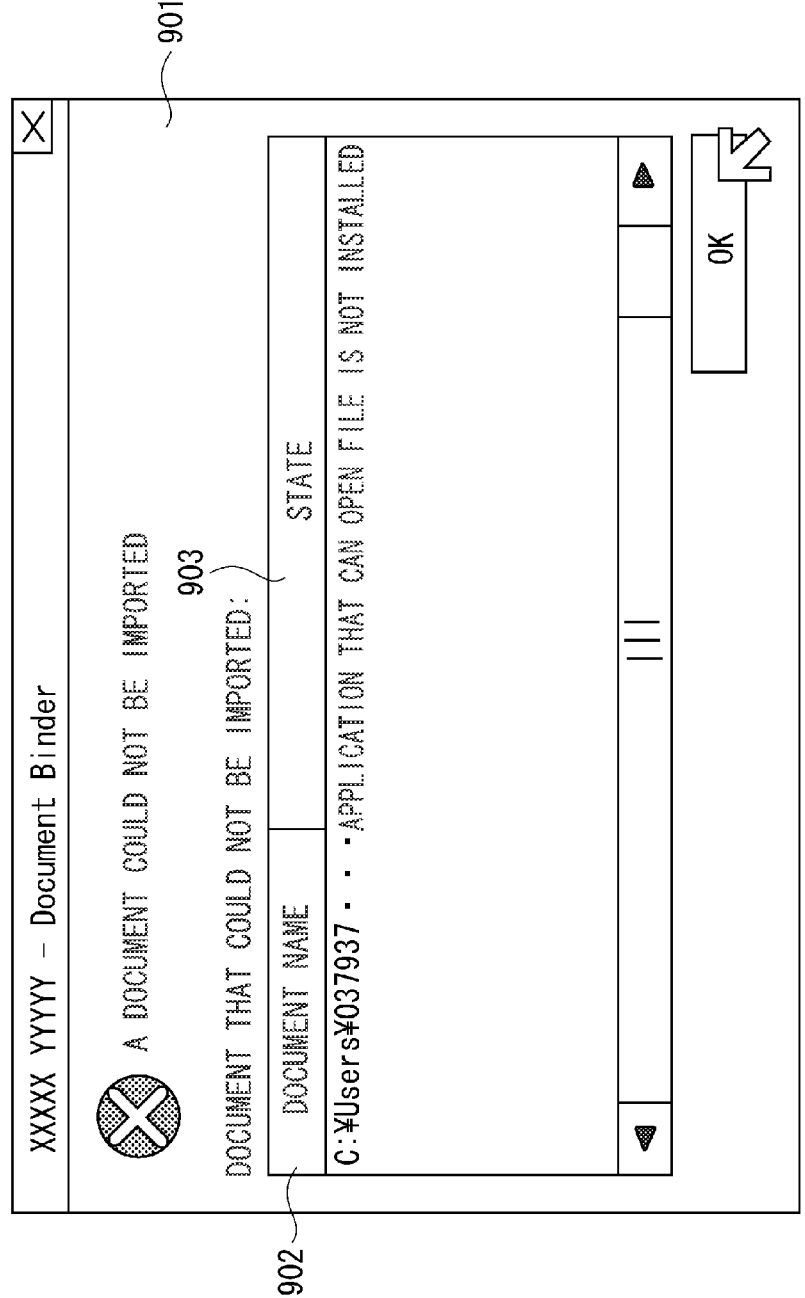
FIG. 9 illustrates an example of a UI which can be displayed by a data processing apparatus.

If there is application data that cannot be converted into PDF because the necessary application is not present, the integration application 401 displays a message such as the example illustrated in FIG. 9 on the display unit 202. The integration application 401 may also display the name of the necessary application, for example.

The print settings of the PDF data input into the integration application 401 are set in a fixed manner by the integration application 401, with the paper size fixed as "same size as original document", printing method fixed as "single side", and layout fixed as "1 up".

What these fixed settings do may be set and changed in advance using the integration application 401.

The integrated PDF data is again converted into a GDI by the integration application 401. The CPU 201 controls a series of single job sending processes so that this GDI (drawing information) is input (5) into the FAX driver 400 called up by the FAX driver 400, and then sent (6) to the image processing apparatus 102 from the FAX driver 400.

The FAX driver 400 generates image data by subjecting monochrome binary bitmap data to modified modified read (MMR) compression based on the received GDI. This image data is packed as a data structure of a job defined by a job start command and a job end command. Then, this data is sent to the image processing apparatus 102.

The image processing apparatus 102 temporarily accumulates the jobs sent from the FAX driver 400 in a memory. After a call is transmitted or Internet FAX negotiation is performed, the data is matched to the capabilities of the FAX receiver acquired during FAX transmission, converted (compressed) into any of joint bi-level image experts group (JBIG), modified Huffman (MH), modified read (MH), or MMR, and sent as FAX data.

On the other hand, if the sending method flag 403 is "0", the GDI converted using the respective applications 405 to 407 by the above-described (2) is output to the FAX driver 400 for each application. In this case, the GDI is output to the FAX driver 400 via route (3)'. More specifically, the GDI is directly input into the FAX driver 400 from the respective applications 405 to 407. Consequently, the FAX driver 400 is called three times, and thus the telephone fee for the FAX transmission processing is a three call amount.

In route (3)', the respective applications 405 to 407 acquire the FAX driver name (FAX ID) from the integration application 401, and based on this FAX ID, execute a control to call the FAX driver 400 by themselves.

FIG. 5 is a schematic diagram illustrating a document processing example of a data processing apparatus according to the present exemplary embodiment.

In FIG. 5, F1 to F4 are document information selected by the user for FAX transmission using a below-described interface. Each of the file formats (data structures) of F1 to F4 is different. Document information F4 has the same file format as that generated by the PDF generation driver 402. Thus, this document information F4 skips the processing performed by the PDF generation driver 402, and is directly transferred to the integration application 401.

C1 to C3 are common document information which all have a PDF file format. C1 to C3 are generated by the PDF generation driver 402, and are transferred to the integration application 401.

CC1 is merged document information generated by merging the common document information C1 to C3 generated by the integration application 401 from the drawing information transferred from each application via the PDF generation driver 402 and document information F4 having a matching file format, into one piece of document information. This document information CC1 merged by the integration application 401 is converted into a one piece of binder information BD. The PDF generation driver 402 converts the drawing information into common document information C1 to C3 in PDF format by executing print processing on the document information F1 to F3 from each application.

The binder information BD converted and generated by the integration application 401 is transferred to the FAX driver 400, and sent as a single FAX job to the image processing apparatus 102.

The print settings for the FAX driver 400 are set with the paper size fixed as "same size as original document", printing method fixed as "single side", and layout fixed as "1 up".

The setting of the FAX transmission destination is configured so that, when the fact that the user pressed the FAX icon is received, the integration application 401 displays a send setting dialog on the display unit 202 so that the user can specify and select the transmission destination. An example of the send setting dialog is illustrated in FIG. 6.

FIG. 6 illustrates an example of a user interface which can be displayed by the data processing apparatus illustrated in FIG. 1.

In FIG. 6, a browser screen 600 displays a user interface corresponding to the functions which can be executed by the integration application 401 to receive and switch an icon selection operation performed by the user. The present example illustrates a state in which the document information to be sent by a FAX job is displayed as an icon in a list. The icons of the respective document information are displayed with specific graphic information added that allows the application to be identified, together with a file extension. Consequently, the user can select the necessary document information while recognizing the document information for different applications.

The sending method stored in the sending method flag 403 is stored as a "1" (bundled transmission) or a "0" (individual transmission) based on the state selected by the user on the selecting property screen.

Figure 7:
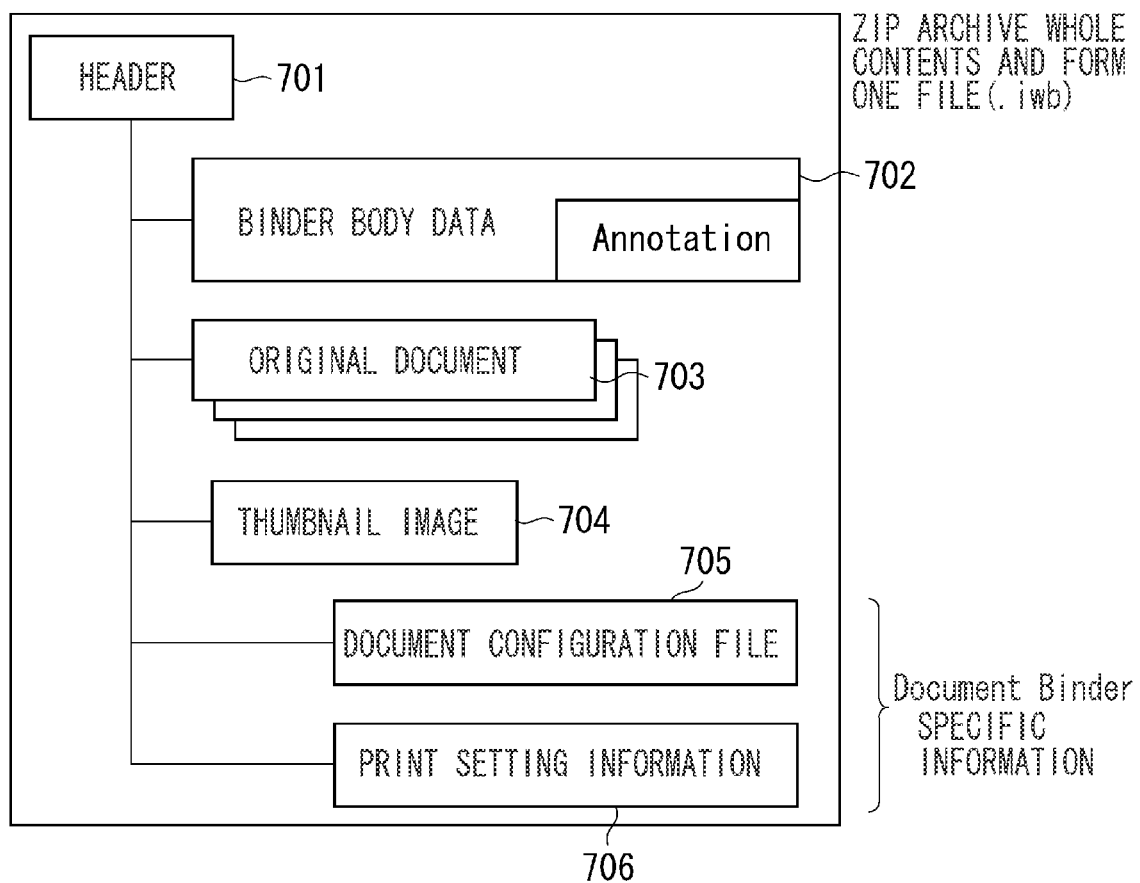
FIG. 7 illustrates a data structure of a binder.

FIG. 7 illustrates a data structure of a binder generated by the integration application 401 illustrated in FIG. 4.

In FIG. 7, a header 701 is linked to and managed by below-described header information. Binder body data 702 corresponds to the data generated by merging and managing the data converted into PDF from the plurality of application data (original document information).

Original document information 703 is configured with a plurality of data groups of a spreadsheet application, a document editing application, and a presentation application.

Thumbnail image information 704 is configured with thumbnail data generated from a snapshot of the original document information 703.

A document configuration file 705 stores a document data structure in a chapter structure (e.g., a definition that an Xth page to a Yth page are Z chapter etc.) of the binder body data 702. In print setting information 706, the above-described "same size as original document" paper size, "single side" printing method, and "1 up" layout are set and stored.

Further, the data processing apparatuses 100-1 and 100-2 according to the present exemplary embodiment are managed by one file produced by compressing the above one binder into a file having a predetermined compression format overall (e.g., ZIP format).

Figure 8C:
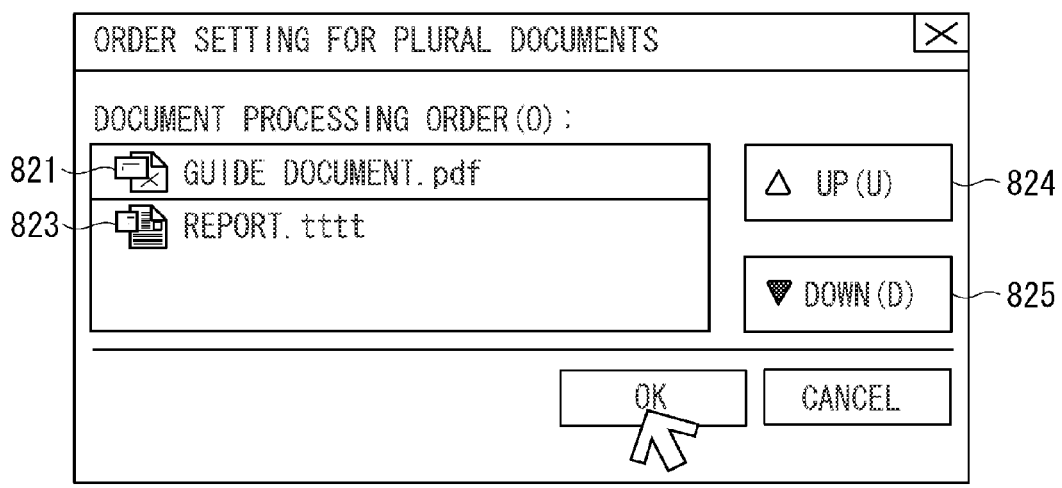

FIG. 8 is a series of figures illustrating an example of user interfaces which can be displayed by the data processing apparatus illustrated in FIG. 1. FIG. 8A corresponds to a FAX setting screen. FIG. 8B corresponds to a FAX sending setting screen. FIG. 8C corresponds to an order setting screen for setting the order of a plurality of documents.

In FIG. 8A, a device name 801 for selecting a FAX is detected by the network, and the name of the image processing apparatus 102 in which the FAX driver 400 is installed is selected and displayed. A button name 802 displays the button name associated with the integration application 401.

If a check box 803 for selecting the sending method is checked, when the file icon displayed on the UI illustrated in FIG. 6 is selected by the user, as the sending method the selected plurality of document information is bundled into one piece of information and sent. Consequently, this bundled information is managed in the state in which the sending method flag 403 is set to "1". Further, the sending method flag 403 is configured so that if the user removes the check in the check box 803, the FAX sending mode switches to a mode in which FAX transmission is performed for each piece of document information by the application associated with the respective document information.

In FIG. 8B, when the integration application 401 receives the fact that a button 810 was pressed by the user, information in an address book managed by the image processing apparatus 102 is acquired. Then, the CPU 201 executes a control for displaying an address book list 812 on the display unit 202 based on the information in the address book acquired from the image processing apparatus 102.

When the integration application 401 receives the fact that a button 811 was pressed by the user, based on information input by the user, a destination name and a FAX number are displayed in a transmission destination address column 813.

In FIG. 8C, information 821 and 823 is selected document information and an instruction to change the order for merging the selected document information can be received when the user selects a button 824 or 825.

More specifically, with respect to the document information selected by the user on the user interface illustrated in FIG. 6, a specific rule, for example a merging order of the document information merged based on a file extension order, file date order, and a file selection order, can be freely changed.

FIG. 9 illustrates an example of a user interface which can be displayed by the data processing apparatus according to the present exemplary embodiment. This example corresponds to the dialog for notifying the user that an error occurred in the import processing into the common document information.

In FIG. 9, an error message 901 indicates the fact that document information not supported by the PDF generation driver 402 is included. More specifically, the error message 901 is displayed when document information in a format which cannot be printed is included in the PDF writer of the PDF generation driver 402. At that stage, a document name 902 and a state 903 are also displayed as the document information which could not be imported by the PDF generation driver 402. More specifically, when an application capable of converting the application data (document information) which has become the print target into the GDI to be input into the PDF writer is not present, an import error occurs, and this fact is displayed. In such a case, if the user wishes to continue with the processing of that document information, the user has to newly import that application, and perform the same processing again.

Figure 10:
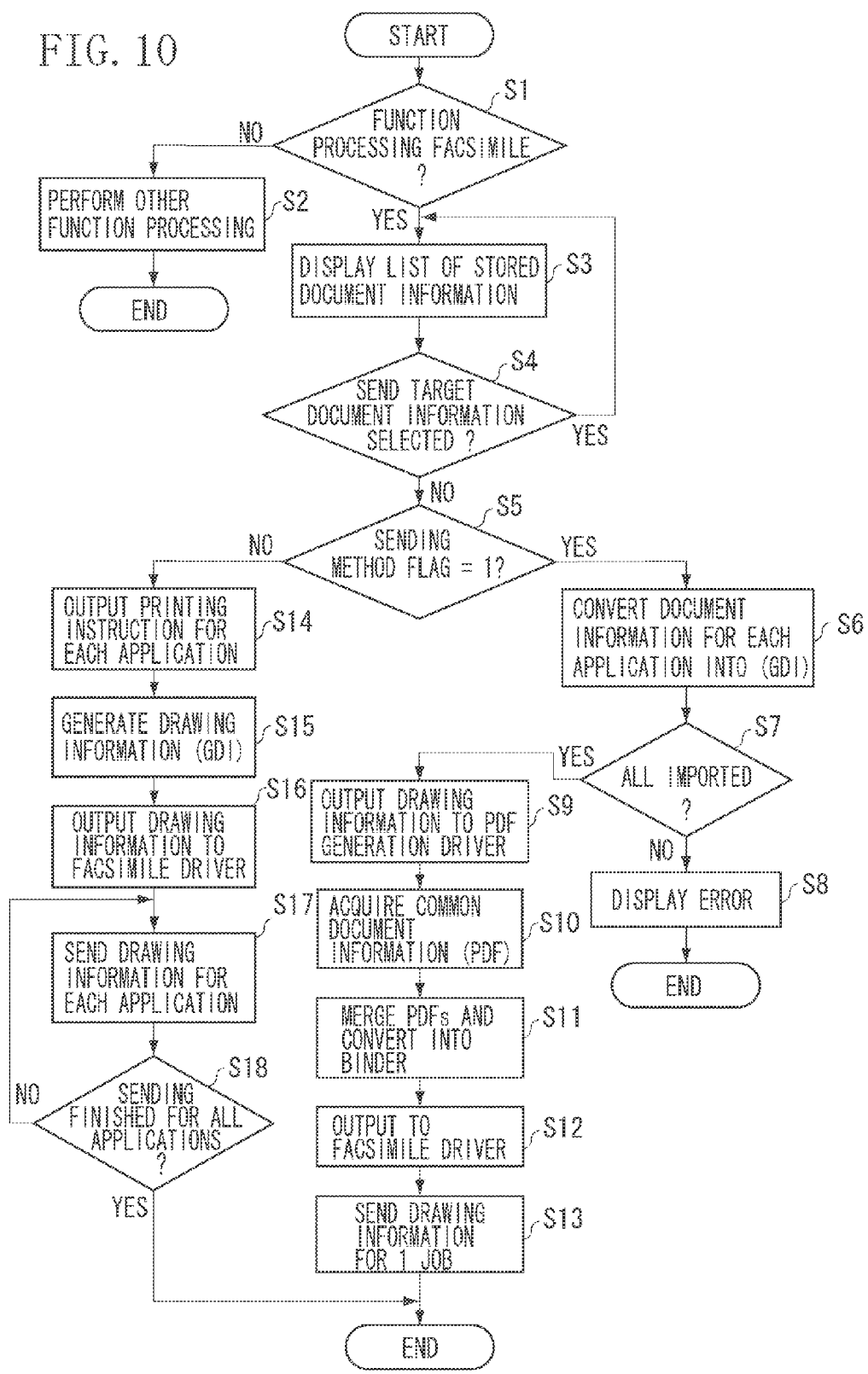
FIG. 10 is a flowchart illustrating a data processing procedure of a data processing apparatus.

FIG. 10 is a flowchart illustrating an example of a data processing procedure performed in the data processing apparatus according to the present exemplary embodiment. The present example is job processing performed by the integration application 401. More specifically, the present example is processing in which a printing instruction is performed for an application corresponding to the document information selected from a list screen by the user, the selected document information is converted into common document information (PDF) using the PDF driver, and the common document information is merged for conversion into a single binder. In FIG. 10, steps S1 to S18 are each realized by the CPU 201, which loads the integration application and the drivers stored in the ROM 204 and the HDD 207 into the RAM 203, and executes the loaded integration application and drivers.

Further, in the present example, the processing is carried out upon reception of a function selection instruction from the user for the integration application 401 illustrated FIG. 6.

First, in step S1, the CPU 201 determines the function type of the icon selected by the user from the screen displayed on the display unit 202 provided by the integration application 401, and determines whether the function type received from the user is a FAX function. If the CPU 201 determines that the function received from the user is not a FAX function (NO in step S1), the processing proceeds to step S2. In step S2, the CPU 201 executes the processing of the other function received from the user, and ends the present processing.

On the other hand, in step S1, if the CPU 201 determines that the function type received from the user is a FAX function (YES in step S1), the processing proceeds to step S3. In step S3, the CPU 201 displays a document list screen on the display unit 202 for selecting a transmission document provided by the integration application 401. This document list screen for selecting a transmission document is configured so that an icon which enables identifying of an attribute of the document information stored in a BOX area allocated in the HDD 207, and the file name including extension of the icon can be displayed.

Then, in step S4, the user operates a pointing device or the like to select from the document list screen the document information which he/she wishes to send. In this step, the user can simultaneously select a plurality of different types of document information that he/she wishes to select (e.g., by a drag operation). Then, the user waits for the FAX transmission instruction for the selected document information. More specifically, in a state in which the user has dragged a plurality of pieces of document information, the subsequent FAX transmission processing is executed when the integration application 401 receives an operation, such as the dropping of the FAX transmission icon illustrated in FIG. 6 into the FAXI.

In step S5, the CPU 201 determines whether the sending method flag specifying the sending method, which was selected in advance by the user in the check box 803 on the user interface illustrated in FIG. 8A, is set to "1". If the CPU 201 determines that the sending method flag is set to "1" (YES in step S5), the processing from step S6 onwards is executed. If the CPU 201 determines that the sending method flag is set to "0" (NO in step S5), the processing from step S14 onwards is executed. The processing from step S14 onwards corresponds to processing for executing FAX transmission processing by outputting the GDI of each application to the FAX driver 400. The processing from step S6 onwards includes processing in which the PDF generation driver 402 converts the GDIs generated by a plurality of applications, and processing in which the integration application 401 merges the respective PDF data into a single PDF file. Further, the processing from step S6 onwards also includes processing for converting the merged PDF file into a binder, and processing for sending by FAX the GDI generated from this converted PDF data as a single job. The processing from step S6 onwards will now be described in more detail.

In step S6, the CPU 201 issues a printing instruction along with the FAX ID to the respective application corresponding to the document information selected by the user via the integration application 401. Then, the CPU 201 executes each application, and generates a GDI command (drawing information) that can be sent by the FAX driver 400 based on this document information.

Next, in step S7, the CPU 201 determines whether all of the drawing information generated by the respective applications could be imported into the PDF generation driver 402. If the CPU 201 determines that all of the drawing information generated by the respective applications could be imported into the PDF generation driver 402 (YES in step S7), the processing proceeds to step S9. If the CPU 201 determines that any one piece of drawing information generated from the document information could not be imported (NO instep S7), the processing proceeds to step S8. The determination concerning whether document information can be imported is performed by referencing the information for determining whether the PDF generation driver 402 can convert the GDI of each application into PDF data, and by referencing the application attributes.

In step S8, the UI illustrated in FIG. 9 presented by the integration application 401 is displayed on the display unit 202 to notify the user of the document information in which an import error occurred, and then the processing is ended. Regarding a GDI which did not show an import error for the PDF generation driver 402, the processing for sending as a single job is continued by the processing from step S9 onwards.

On the other hand, in step S7, if the CPU 201 determines that all of the drawing information generated from the document information could be imported into the PDF generation driver 402 (YES in step S7), the processing proceeds to step S9. Then, in step S9, of the drawing information generated from the selected plurality of pieces of document information, the drawing information determined to be importable is imported into the PDF generation driver 402.

In step S10, the CPU 201 outputs the common document information (PDF) converted by the PDF driver to the integration application 401. In step S11, the CPU 201 operates the integration application 401 to execute merging processing for merging the common document information into a single common document, and binder conversion processing for converting the merged common document information into a binder.

Next, in step S12, the CPU 201 outputs the drawing information based on the binder generated by the integration application 401 to the FAX driver 400. In step S13, the CPU 201 sends the single job of drawing information received by the FAX driver 400 from the integration application 401 to the image processing apparatus 102 corresponding to the FAX ID, and then ends the processing.

On the other hand, the processing of step S14 onwards is FAX transmission processing for each application. First, the CPU 201 outputs a printing instruction including the FAX ID to the respective applications 405 to 407 corresponding to the respective document information selected by the user via the integration application 401.

Next, in step S15, the CPU 201 generates drawing information by executing the respective applications corresponding to the selected document information. Then, in step S16, the CPU 201 outputs the drawing information generated by the respective applications 405 to 407 along with the FAX ID to the FAX driver 400. In step S17, the CPU 201 sends the drawing information as a job for each application to the image processing apparatus 102 via the FAX driver 400. Therefore, if three types of application were selected by the user, the job transmission processing will be repeated three times.

In step S18, the CPU 201 determines whether the processing for sending all of the application drawing information to the image processing apparatus 102 via the FAX driver 400 is completed. If the CPU 201 determines that the processing of the drawing information for each application is not completed (NO in step S18), the processing returns to step S17, and repeats the transmission processing of the drawing information for each application.

On the other hand, in step S18, if the CPU 201 determines that the processing of the drawing information for each application is completed (YES in step S18), the CPU 201 ends the processing.

An exemplary embodiment will now be described in which the processing performed from step S5 onwards is replaced with processing such as that illustrated in FIG. 11.

Next, a second exemplary embodiment according to the present invention will be described. In FIG. 10, the processing is ended when a conversion error occurs even for a single file. However, the sending method can also be performed as follows. More specifically, for files (document data) in which a conversion error occurred, an error message is displayed, and the files are not converted into a PDF. For files in which the applications could be normally converted into a GDI, such files are converted into PDF. The above-described merging processing is performed by the integration application, and the resultant data is sent by FAX as a single job via the FAX driver.

Figure 11:
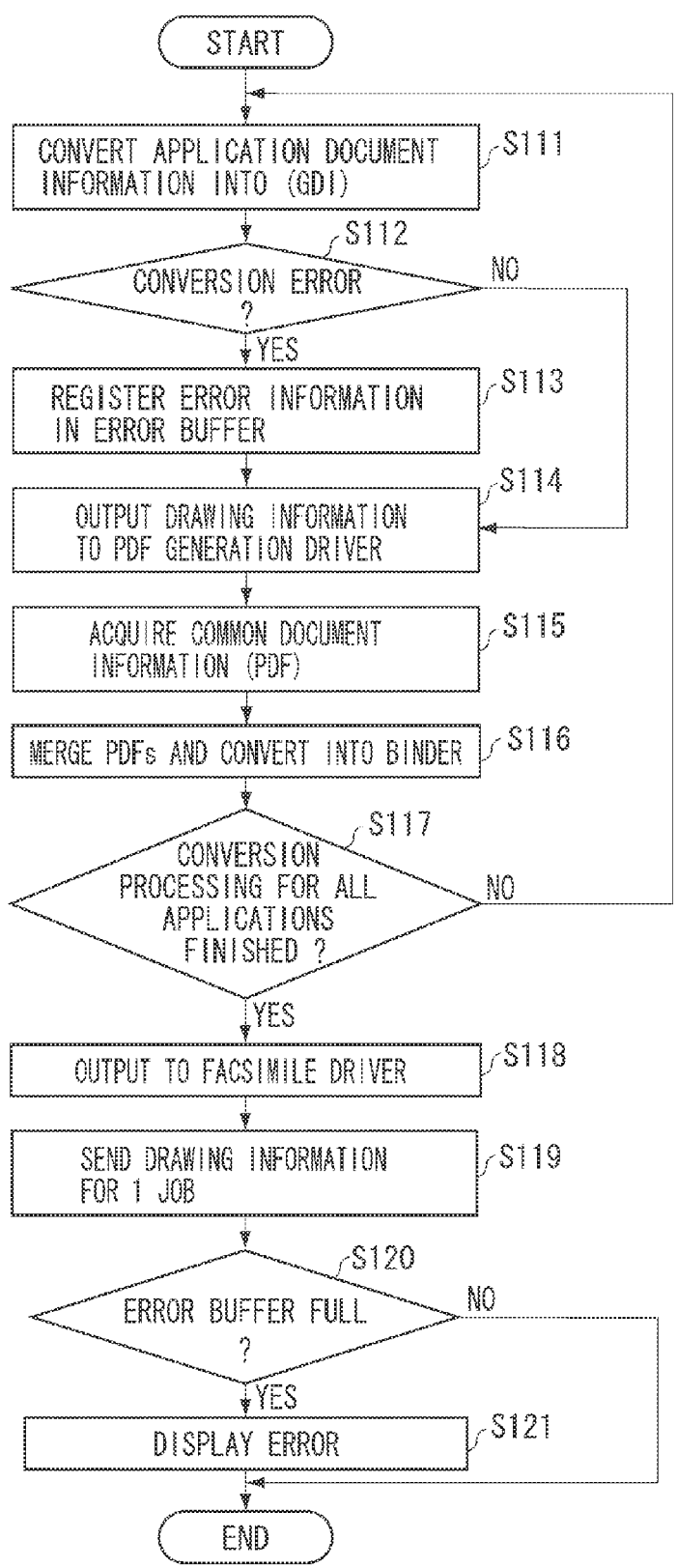
FIG. 11 is a flowchart illustrating a data processing procedure of a data processing apparatus.

FIG. 11 is a flowchart illustrating an example of a data processing procedure performed in the data processing apparatus according to the present exemplary embodiment. This example is job processing performed by the integration application 401, in which the processing from step S5 onwards of FIG. 10 is performed. In FIG. 11, steps S111 to S121 are each realized by the CPU 201, which loads the integration application and the drivers stored in the LAN 204 and the HDD 207 into the RAM 203, and executes the loaded integration application and drivers.

First, in step S111, the CPU 201 executes the respective applications and converts the selected document information. Then, in step S112, the CPU 201 determines whether an error occurred in the conversion processing into the GDI by the respective applications. If the CPU 201 determines that an error did not occur (NO in step S112), the processing proceeds to step S114.

On the other hand, in step S112, if the CPU 201 determines that an error did occur (YES in step S112), the processing proceeds to step S113. In step S113, the CPU 201 registers the error information in an error buffer allocated in the RAM 203. In step S114, when the respective application can be converted into a GDI, the CPU 201 outputs that drawing information to the PDF generation driver 402.

Next, in step S115, the CPU 201 outputs the common document information (PDF) converted by the PDF driver to the integration application 401. In step S116, the CPU 201 operates the integration application 401 to execute merging processing for merging the common document information into a single common document, and binder conversion processing for converting the merged common document information into a binder.

Next, in step S117, the CPU 201 determines whether the conversion into a GDI for all of the applications is finished. If the CPU 201 determines that the conversion is not finished (NO in step S117), the same processing is repeated.

On the other hand, if the CPU 201 determines that the conversion for all of the applications is finished (YES in step S117), the processing proceeds to step S118. In step S118, the CPU 201 outputs the drawing information based on the binder generated by the integration application 401 to the FAX driver 400. Then, in step S119, the CPU 201 sends the single job of drawing information received by the FAX driver 400 from the integration application 401 to the image processing apparatus 102 corresponding to the FAX ID.

In step S120, the CPU 201 determines whether the RAM 203 error buffer is full. If the CPU 201 determines that the error buffer is not full (NO in step S120), the CPU 201 ends the processing. On the other hand, if the CPU 201 determines that the error buffer is full (YES in step S120), the processing proceeds to step S121. In step S121, the CPU 201 displays the error message illustrated in FIG. 9, and then ends the processing.

According to the present exemplary embodiments, document information corresponding to a plurality of applications simultaneously selected by the user from a list of document information generated by the integration application 401 executing different types of applications which it manages, can be sent to an image processing apparatus as a single job.

More specifically, if the user pre-registers in the PDF generation driver 402 whether the FAX sending method is set as "bundled" or not, the FAX transmission processing of document information by the user can be substantially reduced, and communication costs can also be reduced.

Further, since the instruction to execute the FAX transmission processing performed by the user on the integration application is a simple drag and drop operation, the operational burden on the user is also reduced.

In addition, in the above exemplary embodiments, although the PDF data generated by the PDF generation driver 402 was output to the integration application 401 as is, the PDF data may also be displayed as thumbnails or as a list. Moreover, before further converting into a single PDF file, the respective converted pieces of PDF data may be verified, and if necessary, PDF data for pages selected by the user may be deleted from the merged PDF file.

Still further, an editing function may be added to the merged page so that already registered PDF data can be further inserted.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-164139 filed Jul. 10, 2009, which is hereby incorporated by reference herein in its entirety.

What is claimed is:

1. A data processing apparatus comprising:
   a selection unit configured to select a plurality of documents to be sent;
   a sending method selection unit configured to select a first sending method to send the selected plurality of documents as a single job or a second sending method to send the selected plurality of documents as a plurality of jobs;
   a setting unit configured to set an output order for the selected plurality of documents;
   and
   a sending unit configured to send the single job generated from the selected plurality of documents by using the set output order if the first sending method is selected and to send a plurality of jobs generated from the selected plurality of documents by using the set output order if the second sending method is selected.

2. The data processing apparatus according to claim 1, wherein if the second sending method is selected, the sending unit individually sends drawing information generated from the selected plurality of documents to a FAX driver of an image processing apparatus.

3. A data processing method for a data processing apparatus, the data processing method comprising:
   selecting a plurality of documents to be sent;
   selecting a first sending method to send the selected plurality of documents as a single job or a second sending method to send the selected plurality of documents as a plurality of jobs;
   setting an output order for the selected plurality of documents;
   and
   sending the single job generated from the selected plurality of documents by using the set output order if the first sending method is selected and to send a plurality of jobs generated from the selected plurality of documents by using the set output order if the second sending method is selected.

4. The data processing method according to claim 3, wherein if the second sending method is selected, drawing information generated from the selected plurality of documents is individually sent to a FAX driver of an image processing apparatus.

5. A non-transitory storage medium storing a program to be executed by a data processing apparatus, wherein the program causes the data processing apparatus to execute:
   selecting a plurality of documents to be sent;
   selecting a first sending method to send the selected plurality of documents as a single job or a second sending method to send the selected plurality of documents as a plurality of jobs;
   setting an output order for the selected plurality of documents; and
   sending the single job generated from the selected plurality of documents by using the set output order if the first sending method is selected and to send a plurality of jobs generated from the selected plurality of documents by using the set output order if the second sending method is selected.

6. The storage medium according to claim 5, wherein if the second sending method is selected, drawing information generated from the selected plurality of documents is individually sent to a FAX driver of an image processing apparatus.

7. The data processing apparatus according to claim 1 further comprising a setting screen display unit configured to display a sending setting screen, wherein an address book acquired from an image forming apparatus is displayed on the sending setting screen if an instruction to acquire the address book is provided in the sending setting screen.

8. The data processing apparatus according to claim 1, wherein the sending unit sends the selected plurality of documents in the selected sending method if the selected plurality of documents are dropped on a fax transmission icon.

9. The data processing apparatus according to claim 1, further comprising:
   a list display unit configured to display a list of selected documents; and
   an order screen display unit configured to display an order screen for setting the output order for the selected plurality of documents,
   wherein a displaying order for the selected plurality of documents displayed in the order screen is an order for the selected documents displayed by the list display unit.

10. The data processing method according to claim 3 further comprising displaying a sending setting screen, wherein an address book acquired from an image forming apparatus is displayed on the sending setting screen if an instruction to acquire the address book is provided in the sending setting screen.

11. The data processing method according to claim 3, wherein the selected plurality of documents in the selected sending method is sent if the selected plurality of documents are dropped on a fax transmission icon.

12. The data processing method according to claim 3, further comprising:
   displaying a list of selected documents; and
   displaying an order screen for setting the output order for the selected plurality of documents,
      wherein a displaying order for the selected plurality of documents displayed in the order screen is an order for the selected documents displayed.

13. The storage medium according to claim 5 further comprising displaying a sending setting screen, wherein an address book acquired from an image forming apparatus is displayed on the sending setting screen if an instruction to acquire the address book is provided in the sending setting screen.

14. The storage medium according to claim 5, wherein the selected plurality of documents in the selected sending method is sent if the selected plurality of documents are dropped on a fax transmission icon.

15. The storage medium according to claim 5, further comprising:
   displaying a list of selected documents; and
   displaying an order screen for setting the output order for the selected plurality of documents,
      wherein a displaying order for the selected plurality of documents displayed in the order screen is an order for the selected documents displayed.

* * * * *